United States Patent [19]
Batson

[11] Patent Number: 5,599,161
[45] Date of Patent: Feb. 4, 1997

[54] METHOD AND APPARATUS FOR ANTISURGE CONTROL OF MULTISTAGE COMPRESSORS WITH SIDESTREAMS

[75] Inventor: Brett W. Batson, Dallas Center, Iowa

[73] Assignee: Compressor Controls Corporation, Des Moines, Iowa

[21] Appl. No.: 552,788

[22] Filed: Nov. 3, 1995

[51] Int. Cl.$^6$ .................................................. F01D 17/00
[52] U.S. Cl. ................................................ 415/17; 415/1
[58] Field of Search .................................. 415/17, 13, 1

[56] References Cited

U.S. PATENT DOCUMENTS

| | | | |
|---|---|---|---|
| 3,876,326 | 4/1975 | Weitz | 415/17 |
| 4,156,578 | 5/1979 | Agar et al. | 415/17 |
| 4,274,260 | 6/1981 | Bukajlo | 415/17 |
| 4,656,589 | 4/1987 | Albers et al. | 415/17 |
| 4,687,410 | 8/1987 | Cline et al. | 415/17 |
| 4,781,525 | 11/1988 | Hubbard et al. | 415/17 |
| 4,810,163 | 3/1989 | Blotenberg | 415/17 |
| 4,949,276 | 8/1990 | Staroselsky et al. | 415/17 |
| 5,000,459 | 3/1991 | Swearingen et al. | 415/17 |
| 5,355,691 | 10/1994 | Sullivan et al. | |

OTHER PUBLICATIONS

Manual—200–pages from Compressor Controls Corporation printed 1987–1995 and entitled Series 3 Plus Antisurge Controller for Centrifugal and Axial Compressors—Publication IM301 (4.0) Sofware Revision: 753–002 Dec. 1995.

Copy—33 page document by Dr. Naum Staroselsky and Saul Mirsky, P.E.—dated 1986 and entitled More Effective Control Of Refrigeration Compressors.

Primary Examiner—John T. Kwon
Attorney, Agent, or Firm—Henderson & Sturm

[57] ABSTRACT

Compressors for processes, as used for refrigeration systems applied to ethylene production, are multiple stage machines; furthermore, sidestreams enter/exit between the stages. Since a flow measurement device is not available between stages, and the gas temperature entering most stages is unknown, it is difficult to calculate an accurate value for reduced flow for antisurge control purposes. A new method is described, whereby reduced flow alone is replaced by the product of the reduced flow and the equivalent speed. This allows accurate calculation of the distance of the operating point to the surge line since the inlet temperatures into the separate compression units (except the first) are not necessary. The invention described herein can be applied to multistage compression systems for a variety of processes.

24 Claims, 3 Drawing Sheets

METHOD AND APPARATUS FOR ANTISURGE CONTROL OF MULTISTAGE COMPRESSORS WITH SIDESTREAMS

TECHNICAL FIELD

This invention relates generally to a method and apparatus for antisurge control of multistage machines such as refrigeration compressors. More particularly, the invention relates to a method that more accurately calculates the distance of the operating point to its surge line.

BACKGROUND ART

Ethylene and propylene refrigeration compressors are commonly used in refineries for gas separation operations. Control and protection of these compressors is not only among the most complex of control applications, but a challenge fraught with inaccuracies. However, it is also an application where the economics of good control is large. Although energy savings can be profitable, an important objective is to maximize production while minimizing process upsets, surge, and shutdowns.

Most refrigeration systems are multistage machines with sidestreams entering and/or exiting between the stages. Since flow measurement devices are not available between stages, and the gas temperature entering most stages is unknown, it is impossible to calculate reduced flow reliably.

The method commonly used today requires the assumption be made that temperatures into the separate stages do not change considerably. When temperatures do change, the safety margin must be increased to protect the compressor under worst-case conditions.

DISCLOSURE OF THE INVENTION

The purpose of the invention is to provide a method for more accurately calculating the distance of the operating point to its surge line for use in antisurge control.

For the most part, refrigeration systems are multistage units with sidestreams entering and/or exiting between the stages. In this type configuration, calculating a reliable reduced flow directly is impossible because a flow measurement device is not available at the inlet of all stages. It is also impossible to infer reduced flow from the available flow measurements since the gas temperature entering most stages is unknown. Therefore, a method used today assumes that the temperatures into the separate stage do not change significantly, but when they do change, the compressors must be protected under worst-case conditions by increasing the safety margin.

The patent incorporates a method of antisurge control, whereby reduced flow squared ($q^2$) alone, is replaced by reduced flow times equivalent speed squared ($q^2 N_e^2$), which allows accurate calculation of the operating point to the surge line; and inlet temperatures into the separate stages are not necessary.

BEST MODE FOR CARRYING OUT THE INVENTION

Although the disclosure for the best mode refers specifically to refrigeration compressors, it should be understood that the invention has broader application to multistage compressors in other processes.

To minimize process upsets, surge, and shutdowns of a refrigeration system, precise and fast control application is paramount. Most such systems comprise multistage machines, wherein flow measurements are not available between stages, and the gas temperature entering most stages is unknown. It is, therefore, difficult to calculate an accurate reduced flow with which to calculate the distance to surge, and to effectively deal with compressor transients.

Figure 1:
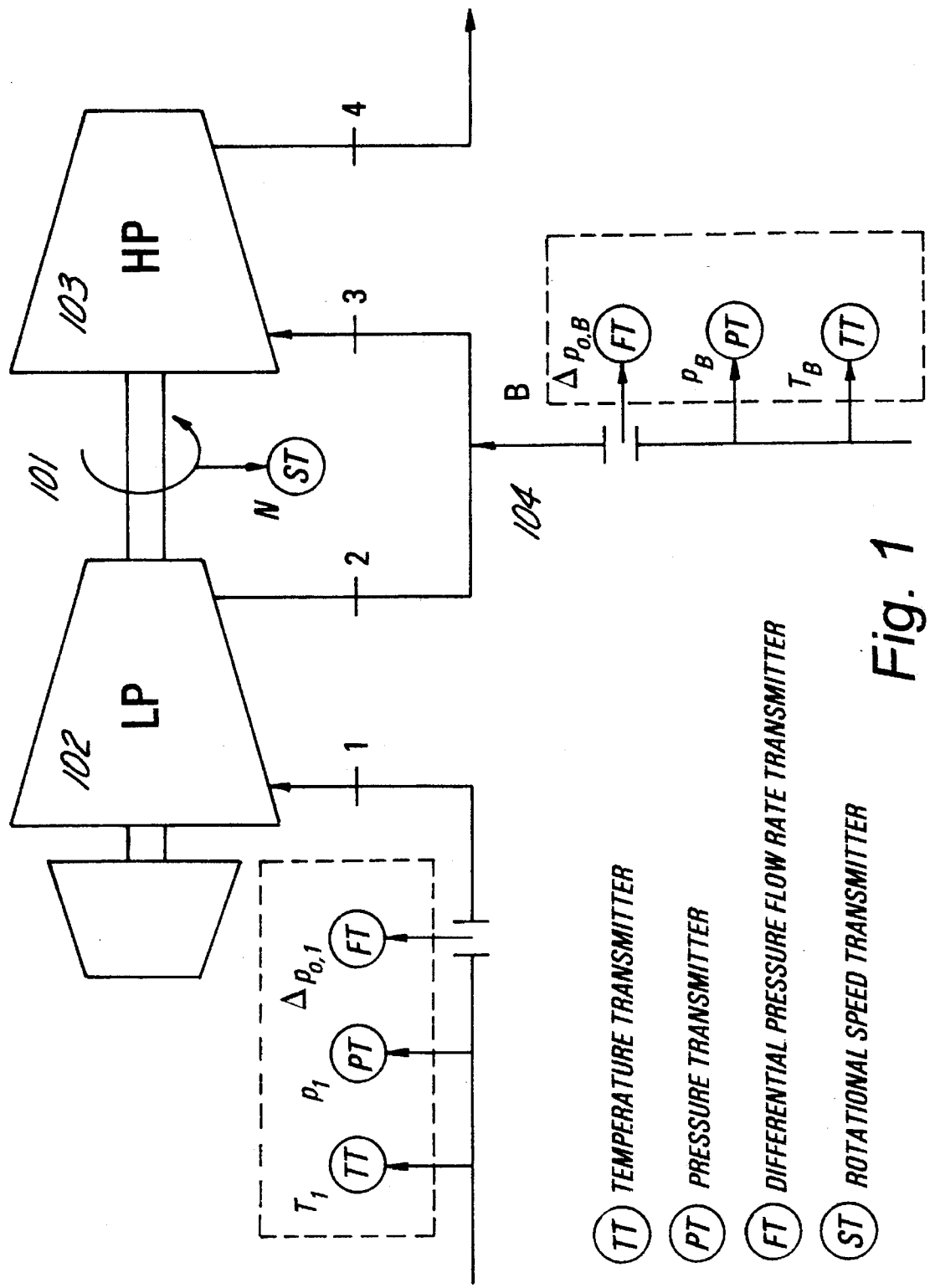
FIG. 1 shows a representative multistage compression system.

FIG. 1 depicts a representative multistage compression system 101 consisting of a low-pressure stage (LP) 102, high-pressure stage (HP) 103, a sidestream for flow admission or extraction (B) 104, and designated locations (1, 2, 3, and 4). Measurement devices are included for rotational speed (N) and for flow ($\Delta p_o$), pressure (p), and temperature (T) at B and location 1.

The proposed method suggests that the reduced flow ($q^2 = \Delta p_o/p$) alone be replaced by the squared product of reduced flow and equivalent speed ($q^2 N_e^2$). It employs a phantom differential pressure signal in the suction of each stage (subscripts denote locations shown in FIG. 1), which would be equal to $$\Delta p_{o,3} = \frac{1}{A_3} \frac{(\dot{m}_1 + \dot{m}_B)^2}{\rho_3} \quad (1)$$

where:

$\Delta p_o$ = pressure drop across flow measurement device (orifice plate or venturi)

A = orifice or venturi constant (converts $\dot{m}^2/\rho$ to a pressure difference)

1 = suction of first stage (subscript)

3 = suction of second stage (subscript)

$\dot{m}$ = mass flow rate $\rho$ = density

B = sidestream (subscript)

Mass flow rates can also be represented as functions of differential pressure measurements:

$$\Delta p_{o,3} = \frac{1}{A_3} \frac{(\sqrt{A_1 \Delta p_{o,1} \rho_1} + \sqrt{A_B \Delta p_{o,B} \rho_B})^2}{\rho_3} \quad (2)$$

A present-day approach is to calculate $\Delta p_{o,3}$ as $$\Delta p_{o,3} = (C_1 \sqrt{\Delta p_{o,1} f(R_{c,LP})} + C_B \sqrt{\Delta p_{o,B}})^2 \quad (3)$$

where:

$C_1$ = constant $C_B$ = constant f() = converts differential pressure signal from the suction of the low-pressure stage to the discharge of that stage $R_c$ = pressure ratio LP = low-pressure stage (subscript)

Similarity between Eqs. (2) and (3) can be seen when expanding out the densities in Eq. (2) and noting that $p_B = p_3$:

$$\Delta p_{o,3} = \frac{\left(\sqrt{A_1 \Delta p_{o,1} \frac{p_1}{(ZRT)_1}} + \sqrt{A_B \Delta p_{o,B} \frac{p_3}{(ZRT)_B}}\right)^2}{A_3 \frac{p_3}{(ZRT)_3}}$$

or, $$\Delta p_{o,3} = \frac{\left(\sqrt{A_1 \Delta p_{o,1} \frac{p_1}{p_3} \frac{(ZRT)_3}{(ZRT)_1}} + \sqrt{A_B \Delta p_{o,B} \frac{(ZRT)_3}{(ZRT)_B}}\right)^2}{A_3}$$

where:

Z=compressibility

R=gas constant

T=temperature

If compressibilities do not change considerably, the quotient $$\frac{(ZRT)_2}{(ZRT)_1} = \kappa R_{c,LP}^{\sigma}$$

where:

$\kappa = Z_2/Z_1$ $\sigma = \log(T_2/T_1)/\log(p_2/p_1)$ and, assuming that the ratios $$\frac{(ZRT)_3}{(ZRT)_2} \text{ and } \frac{(ZRT)_3}{(ZRT)_B}$$

are approximately constant, then $$\Delta p_{o,3} = \left(\sqrt{\Lambda_1 \Delta p_{o,1} \left(\frac{p_3}{p_1}\right)^{\sigma-1}} + \sqrt{\Lambda_B \Delta p_{o,B}}\right)^2$$

where:

$\Lambda_1 = A_1[(ZRT)_3/(ZRT)_2]$ $\Lambda_B = A_B[(ZRT)_3/(ZRT)_B]$ which is seen to be Eq. (3) with $f_1(R_{cLP}) = R_{cLP}^{\sigma-1}$, $C_1 = \sqrt{\Lambda_1}$, and $C_B = \sqrt{\Lambda_B}$ where it has been assumed that $p_2 = p_3$.

To accurately calculate distance between the operating point of a compressor and its surge line, it is prudent to use parameters for which that distance is invariant to changes in suction conditions like temperature. Reduced flow (q) is such a parameter:

$$q = \sqrt{\frac{\Delta p_o}{p}} = \frac{\dot{m}}{\sqrt{\rho p}} \quad (4)$$

Pressure ratio ($R_c = p_d/p_s$) is another such parameter in which $p_d$ is absolute pressure at discharge and $p_s$ is absolute pressure in suction. Still another is equivalent speed ($N_e$) with N=rotational speed, and defined as $$N_e = \frac{N}{\sqrt{ZRT}} = N\sqrt{\frac{\rho}{p}} \quad (5)$$

Any combination—linear or nonlinear—of invariant coordinates is also invariant and can be used for control. To eliminate the dependency on temperature values not available, Eqs. (4) and (5) can be combined as follows:

$$q^2 N_e^2 = \frac{\dot{m}^2}{\rho p} N^2 \frac{\rho}{p} = \left(\frac{\dot{m}}{p} N\right)^2$$

in which all variables are measured or can be computed easily for these multistage applications. Mass flow, in particular, must be calculated using flow measurements available and the temperatures and pressures, at the locations of the flow measurement devices. In other words, working from one end of the compressor (e.g., inlet end), mass flows can be calculated entering and exiting the compressor case, so simple subtraction or addition is all that is required to determine mass flow passing through a given stage. It should be noted that the same is true if the flow measurement signal is not available at location 1 in FIG. 1, but is, instead, available at the discharge of the high-pressure stage 103 (location 4). In this case, the mass flow rate through the low-pressure stage 102 can be calculated as the difference between the flow exiting the high-pressure stage and flow entering at the sidestream (B) 104.

It is ideal to control each stage using two invariant coordinates-one can be used as the independent variable in a function to characterize the other on the surge limit line, to construct an antisurge parameter:

$$S_s = \frac{f(y)}{x} \quad (7)$$

Because $R_c$ is known for each stage of compression, it is a sound choice for y. Using reduced flow ($\Delta p_o/p$) alone, for the high-pressure stages, does not appear to be a good choice because of the lack of flow and temperature measurements between stages. However, the product introduced in Eq. (6) is a good choice and can be represented as $$q_3^2 N_e^2 = \frac{(\sqrt{\Lambda_1 \Delta p_{o,1} \rho_1} + \sqrt{\Lambda_B \Delta p_{o,B} \rho_B})^2 N^2}{A_3 p_3^2} \quad (8)$$

Equation 8 reveals a parameter which can be used to define the distance to surge. This distance will be invariant to suction conditions. In other words, $q_3^2 N_e^2$ can be used in place of x in Eq. (7); moreover, all variables appearing in this equation are known. In terms of the pressures and temperatures that are known, $$\frac{\Delta p_{o,3}}{p_3} N_e^2 = q_3^2 N_e^2 = \quad (9)$$

$$\frac{\left(\sqrt{A_1 \Delta p_{o,1} \left(\frac{p}{ZRT}\right)_1} + \sqrt{A_B \Delta p_{o,B} \left(\frac{p}{ZRT}\right)_B}\right)^2 N^2}{A_3 p_3^2}$$

or, $$q_3^2 N_e^2 = \quad (10)$$

$$\frac{1}{A_3} \left(\frac{\left(\sqrt{A_1^* \Delta p_{o,1} \left(\frac{p}{T}\right)_1} + \sqrt{A_B^* \Delta p_{o,B} \left(\frac{p}{T}\right)_B}\right) N}{p_3}\right)^2$$

where it is assumed that the compressibilities (Z) are fairly constant. For control purposes, the square root of Eq. (10) could be taken to simplify the implementation. The antisurge parameter [Eq. (7)] is then, $$S_s = \frac{f_1(R_c)}{q_3^2 N_e^2} = \frac{f_1(R_c)}{N^2 \dot{m}_3^2/p_3^2} \tag{11}$$

where N is the rotational speed; $\dot{m}$ is mass flow rate through the stage of interest (calculated using known mass flows in the compression system); and $f_1(R_c)$ returns the value of $q_3^2 N_e^2$ at surge, so $S_s$ goes to unity on the surge limit line-the square root of $q_3^2 N_e^2$ is also valid for defining the distance to surge, i.e., $S_s = f_2(R_c)/q_3 N_e$. The implication or Eq. (11) is that it can be used for any stage in the refrigeration system which lacks either a flow measurement device or a temperature transmitter.

Figure 2:
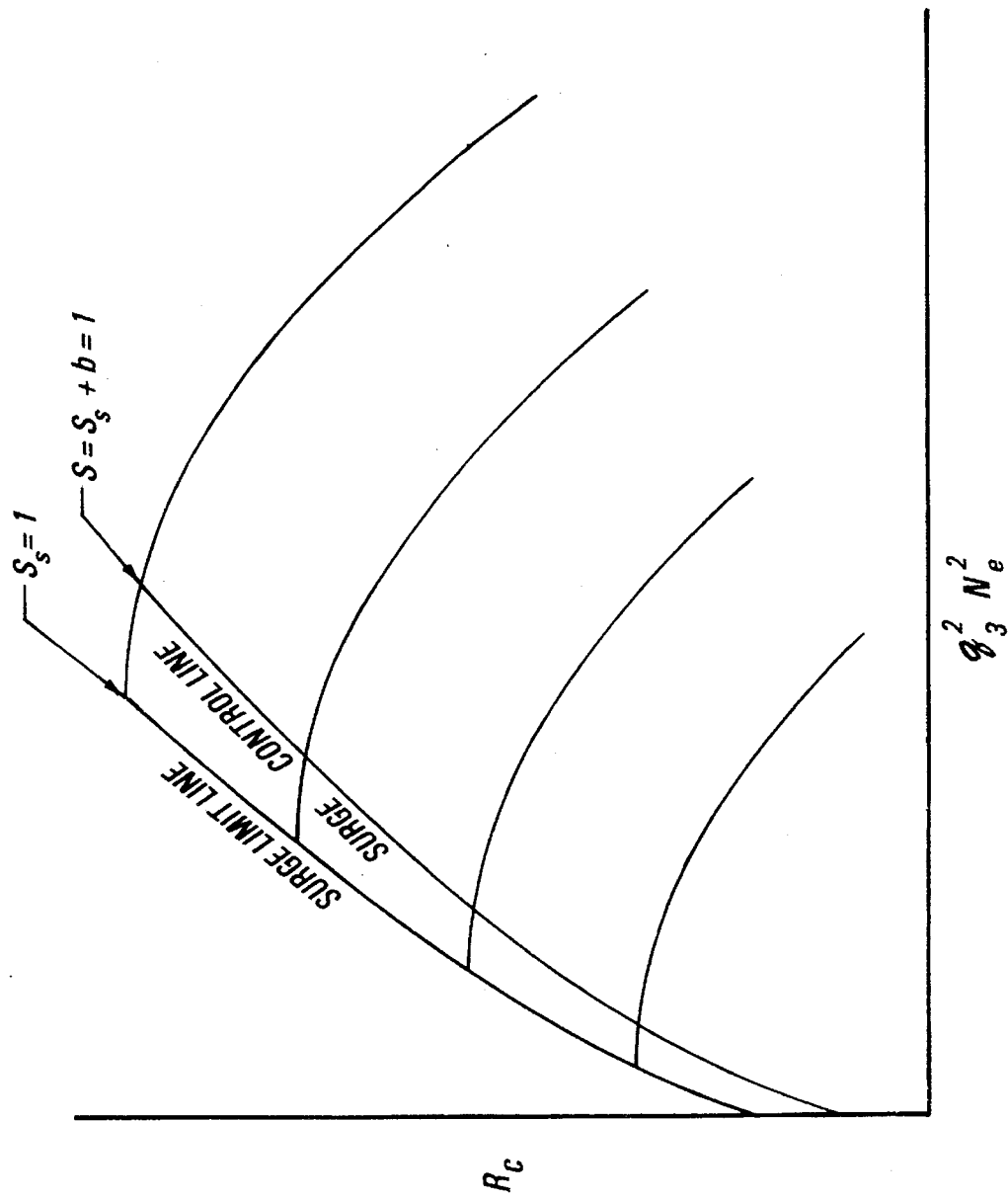
FIG. 2 shows a compressor map comprising surge lines.

The control algorithm which employs the antisurge parameter in Eq. (11) uses the fact that $S_s$ will be equal to one on the surge limit line, and it is less than unity to the safe (right) side of the surge limit line. A safety margin (b) is added to $S_s$ to construct the surge control line ($S=S_s+b$) as depicted in FIG. 2. The definition for the distance between the operating point and the surge control line can then be described simply as $$\delta = 1 - S \tag{12}$$

Figure 3:
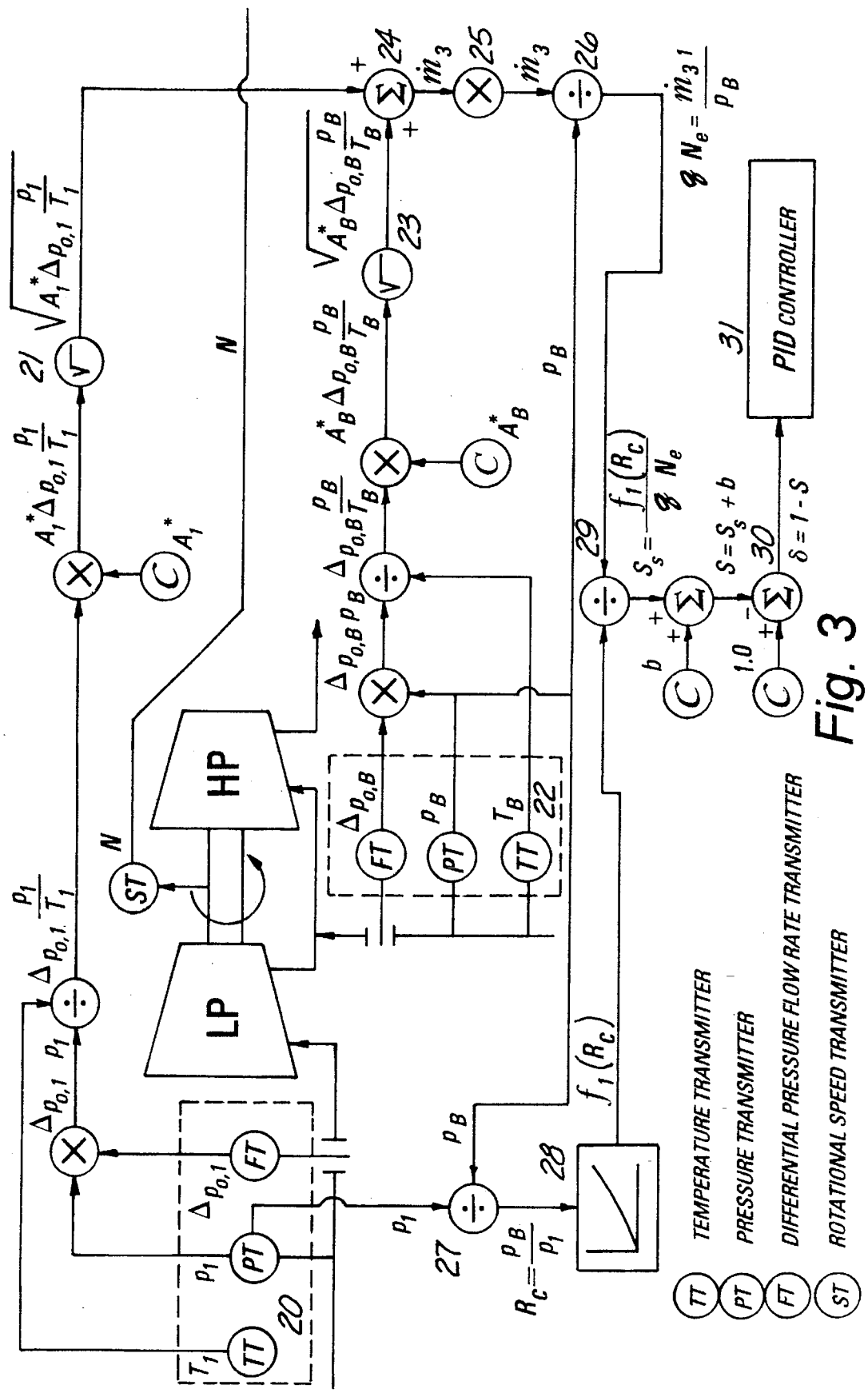
FIG. 3 shows a block diagram of a control scheme for a multistage compression system, inputting to a PID controller.

This distance, or error, describes a parameter that is positive in the safe region (to the right of the surge control line), and zero on the surge control line. It can then be passed to a PID control algorithm which calculates the required output for the recycle valve associated with that particular compressor stage. In particular, this output would be calculated as follows:

$$\text{OUT} = G\delta + K_r \int \delta dt + T_d \frac{d\delta}{dt} \quad \text{with } 0 \leq \text{OUT} \leq 100\%$$

where:
G=proportional gain
$K_r$=integral reset rate
$T_d$=derivative time constant A block diagram of the $\delta$ calculation [Eq. (12)] is shown in FIG. 3, wherein output information from a low-pressure compressor stage and from a sidestream is computed to define $\delta$. In the figure, transmitter data ($T_1$, $p_1$, and $\Delta p_{o,1}$) 20 are acted on by algebraic operations to produce a value proportional to mass flow $$(\sqrt{A_1 * \Delta p_{o,1} p_1/T_1})$$

21. Concurrently, data from the sidestream transmitters ($T_B$, $p_B$, and $\Delta p_{o,B}$) 22 produce a similar value $$(\sqrt{A_B * \Delta p_{o,B} p_B/T_B})$$

23.

A summing module 24 computes the two prior values 21, 23 as a mass flow rate ($\dot{m}_3$) which, in turn, is multiplied by rotational speed (N) generating a product ($\dot{m}_3 N$) 25, and is then divided by absolute pressure ($p_B$) to specify a parameter (q $N_e$) 26. Following this, pressure ratio ($R_c$) 27 is characterized [$f_1(R_c)$] 28 and divided by q $N_e$ to generate an antisurge parameter ($S_s$) 29, from which summing operations determine the distance equation value ($\delta$) 30 for input to a PID controller 31.

It should be noted that the present invention can be applied to compressors of any number of stages as long as the required instrumentation is available. Also, any number of stages can be lumped together as a controlled compression unit and treated the same way as described above for individual stages.

Obviously many modifications and variations of the present invention are possible in light of the above teachings. It is, therefore, to be understood that, within the scope of the appended claims, the invention may be practiced otherwise than as specifically described.

I claim:

1. A method for antisurge control of a compression unit of one or more combined stages of a multistage compressor comprising the acquisition of a mass flow rate ($\dot{m}$) through, a compression ratio ($R_c$) across, a rotational speed (N) of, and a pressure (p) in suction or discharge of the compression unit, the method comprising the steps of:

(a) computing a value for $qN_e = (\dot{m}N)/p$ for the compression unit;

(b) computing a surge parameter, $S_s = f(R_c, qN_e)$, for the compression unit; and (c) using the value of $S_s$ for antisurge control.

2. A method for antisurge control of a multistage compressor system comprising suction and discharge piping and a relief mechanism, the method comprising the steps of:

(a) determining a surge line for a compression unit of one or more compressor stages of the multistage compressor as a function of a parameter, $qN_e = (\dot{m}N)/p$;

(b) computing an operating point for the compression unit as a function of the parameter, $qN_e$;

(c) comparing the compression unit's operating point with the surge line;

(d) generating a control signal based on the comparison; and (e) applying the control signal to the relief mechanism for the purpose of antisurge control.

3. The method of claim 2 whereby the step of comparing the compression unit's operating point with the surge line comprises the steps of:

(a) computing a set point value at a predetermined position relative to the surge line; and (b) comparing the operating point with the set point value.

4. The method of claim 3 whereby the predetermined position is variable.

5. The method of claim 2 wherein the surge line is also determined as a function of pressure ratio, $R_c$.

6. The method of claim 2 wherein the operating point is also computed as a function of pressure ratio, $R_c$.

7. The method of claim 2 wherein the surge line is also determined as a function of reduced head, $h_r = (R_c^\sigma - 1)/\sigma$, with $\sigma = \log(T_d/T_s)/\log R_c$.

8. The method of claim 2 wherein the operating point is also computed as a function of reduced head, $h_r = (R_c^\sigma - 1)/\sigma$, with $\sigma = \log(T_d/T_s)/\log R_c$.

9. The method of claim 2 wherein the step of computing an operating point comprises the steps of:

(a) receiving a signal proportional to a mass flow rate through a compression unit immediately upstream of the compression unit;

(b) receiving a signal proportional to a mass flow rate through a side-stream located at a suction side of the compression unit;

(c) adding the signals if the sidestream flow is entering the compressor or subtracting the sidestream signal from the low-pressure signal if the sidestream flow is exiting the compressor, to calculate a value proportional to the mass flow passing through the compression unit;

(d) sensing a signal proportional to a rotational speed of the compressor;

(e) sensing a signal proportional to a pressure at a suction or discharge side of the compression unit; and (f) multiplying the mass flow value times the rotational speed signal and dividing the product by the pressure signal.

10. The method of claim 3 wherein the step of computing a set point value determining the surge line as a function of a pressure ratio, $R_c$, comprises the steps of:

(a) determining the surge line as a function of a pressure ratio, $R_c$, and $qN_e$;

(b) selecting a reference pressure ratio value; and (c) setting the set point at the reference pressure ratio value, a predetermined distance from the surge line.

11. The method of claim 3 wherein the step of computing a set point value comprises the steps of:

(a) determining the surge line as a function of a reduced head, $h_r$, and $qN_e$;

(b) selecting a reference reduced head value; and (c) setting the set point at the reference reduced head value, a predetermined distance from the surge line.

12. The method of claim 9 whereby the step of calculating the values proportional to the mass flow rates comprises the steps of:

(a) sensing a differential pressure produced by a flow measurement device and calculating a value proportional to the differential pressure;

(b) sensing a pressure in the proximity of the flow measurement device and calculating a value proportional to the pressure;

(c) sensing a temperature in the proximity of the flow measurement device and calculating a value proportional to the temperature; and (d) multiplying the differential pressure value times the pressure value, dividing by the temperature value, and taking the square root of this quantity.

13. An apparatus for antisurge control of a compression unit of one or more combined stages of a multistage compressor comprising the acquisition of a mass flow rate ($\dot{m}$) through, a compression ratio ($R_c$) across, a rotational speed (N) of, and a pressure (p) in suction or discharge of the compression unit, the apparatus comprising:

(a) means for computing a value for $qN_e=(\dot{m}N)/p$ for the compression unit;

(b) means for computing a surge parameter, $S_s=f(R_c, qN_e)$, for the compression unit; and (c) means for using the value of $S_s$ for antisurge control.

14. An apparatus for antisurge control of a multistage compressor system comprising suction and discharge piping and a relief mechanism, the apparatus comprising:

(a) means for determining a surge line for a compression unit of one or more compressor stages of the multistage compressor as a function of a parameter, $qN_e=(\dot{m}N)/p$;

(b) means for computing an operating point for the compression unit as a function of the parameter, $qN_e$;

(c) means for comparing the compression unit's operating point with the surge line;

(d) means for generating a control signal based on the comparison; and (e) means for applying the control signal to the relief mechanism for the purpose of antisurge control.

15. The apparatus of claim 14 whereby the step of comparing the compression unit's operating point with the surge line comprises:

(a) means for computing a set point value at a predetermined position relative to the surge line; and (b) means for comparing the operating point with the set point value.

16. The apparatus of claim 15 whereby the predetermined position is variable.

17. The apparatus of claim 14 wherein the surge line is also determined as a function of pressure ratio, $R_c$.

18. The apparatus of claim 14 wherein the operating point is also computed as a function of pressure ratio, $R_c$.

19. The apparatus of claim 14 wherein the surge line is also determined as a function of reduced head, $h_r=(R_c^\sigma-1)/\sigma$, with $\sigma=\log(T_d/T_s)/\log R_c$.

20. The apparatus of claim 14 wherein the operating point is also computed as a function of reduced head, $h_r=(R_c^\sigma-1)/\sigma$, with $\sigma=\log(T_d/T_s)/\log R_c$.

21. The apparatus of claim 14 wherein the step of computing an operating point comprises:

(a) means for receiving a signal proportional to a mass flow rate through a compression unit immediately upstream of the compression unit;

(b) means for receiving a signal proportional to a mass flow rate through a sidestream located at a suction side of the compression unit;

(c) means for adding the signals if the sidestream flow is entering the compressor or subtracting the sidestream signal from the low-pressure signal if the sidestream flow is exiting the compressor, to calculate a value proportional to the mass flow passing through the compression unit;

(d) means for sensing a signal proportional to a rotational speed of the compressor;

(e) means for sensing a signal proportional to a pressure at a suction or discharge side of the compression unit; and (f) means for multiplying the mass flow value times the rotational speed signal and dividing the product by the pressure signal.

22. The apparatus of claim 15 wherein the step of computing a set point value comprises:

(a) means for determining the surge line as a function of a pressure ratio, $R_c$, and $qN_e$;

(b) means for selecting a reference pressure ratio value; and (c) means for setting the set point at the reference, pressure ratio value, a predetermined distance from the surge line.

23. The apparatus of claim 15 wherein the step of computing a set point value comprises:

(a) means for determining the surge line as a function of a reduced head, $h_r$, and $qN_e$;

(b) means for selecting a reference reduced head value; and (c) means for setting the set point at the reference reduced head value a predetermined distance from the surge line.

24. The apparatus of claim 21 whereby the step of calculating the values proportional to the mass flow rates comprises:

(a) means for sensing a differential pressure produced by a flow measurement device and calculating a value proportional to the differential pressure;

(b) means for sensing a pressure in the proximity of the flow measurement device and calculating a value proportional to the pressure;

(c) means for sensing a temperature in the proximity of the flow measurement device and calculating a value proportional to the temperature; and (d) means for multiplying the differential pressure: value times the pressure value, dividing by the temperature value, and taking the square root of this quantity.

* * * * *

UNITED STATES PATENT AND TRADEMARK OFFICE
CERTIFICATE OF CORRECTION

PATENT NO.  : 5,599,161  
DATED       : February 4, 1997  
INVENTOR(S) : Brett W. Batson Page 1 of 3

It is certified that error appears in the above-indentified patent and that said Letters Patent is hereby corrected as shown below:

column 1, line 55 delete "$(q^2 N_e^2)$" and insert -- $\left(q^2 N_e^2\right)$ --.

column 2, line 28, delete "$(q^2 N_e^2)$" and insert -- $\left(q^2 N_e^2\right)$ --.

column 2, line 61, delete "f()" and insert --f(·)--.

column 3, line 45, delete "$f_1(R_{cLP}) = R_{cLP}^{\sigma-1}$" of the equation and insert -- $f_1\left(R_{c,LP}\right) = R_{c,LP}^{\sigma-1}$ --.

column 4, line 1, of the issued patent delete "$q^2 N_e^2$" of the equation and insert -- $q^2 N_e^2$ --.

column 4, line 1, insert --(6)-- after the equation, at right margin flush.

column 4, line 24, delete "coordinates-one" and insert --coordinates—one--.

column 4, line 38, delete "$q_3^2 N_e^2$" and insert -- $q_3^2 N_e^2$ --.

column 4, line 38, delete "$A_3 p_3^2$" and insert -- $A_3 p_3^2$ --.

column 4, line 42, delete "$q_3^2 N_e^2$" and insert -- $q_3^2 N_e^2$ --.

column 4, line 47, delete "$N_e^2 = q_3^2 N_e^2 =$" and insert -- $N_e^2 = q_3^2 N_e^2 =$ --.

column 4, line 53, delete "$A_3 p_3^2$" and insert -- $A_3 p_3^2$ --.

UNITED STATES PATENT AND TRADEMARK OFFICE
CERTIFICATE OF CORRECTION

PATENT NO. : 5,599,161

DATED : February 4, 1997

INVENTOR(S) : Brett W. Batson

It is certified that error appears in the above-indentified patent and that said Letters Patent is hereby corrected as shown below:

column 4, line 56, delete "$q_3^2 N_e^2 =$" and insert -- $q_3^2 N_e^2 =$ --.

column 4, line 60, delete "$A_1^*$" and insert -- $A_1^*$ --.

column 4, line 60, delete "$A_B^*$" and insert -- $A_B^*$ --.

column 5, line 1, delete "$q_3^2 N_e^2$" and insert -- $q_3^2 N_e^2$ --.

column 5, line 1, delete "$N^2 \dot{m}_3^2 / p_3^2$" and insert -- $N^2 \dot{m}_3^2 / p_3^2$ --.

column 5, line 7, delete "$q_3^2 N_e^2$" and insert -- $q_3^2 N_e^2$ --.

column 5, line 7, delete "line-the" and insert --line—the--.

column 5, line 8, delete "$q_3^2 N_e^2$" and insert -- $q_3^2 N_e^2$ --.

column 5, line 20, delete "(12)" and insert --(12)-- after the equation, at right margin flush.

column 5, line 44, delete "$A_1^*$" and insert -- $A_1^*$ --.

column 5, line 50, delete "$A_B^*$" and insert -- $A_B^*$ --.

UNITED STATES PATENT AND TRADEMARK OFFICE
CERTIFICATE OF CORRECTION

PATENT NO. : 5,599,161
DATED : February 4, 1997
INVENTOR(S) : Brett W. Batson

It is certified that error appears in the above-indentified patent and that said Letters Patent is hereby corrected as shown below:

In the Claims at column 6, line 43, claim 7 (line 2), delete "$R_c^\sigma$" of the equation and insert -- $R_c^\sigma$ --.

In the Claims at column 6, line 46, claim 8 (line 2), delete "$R_c^\sigma$" and insert -- $R_c^\sigma$ --.

In the Claims at column 7, line 3, claim 10 (line 3), delete "determining the surge line as a function of a pressure ratio,".

In the Claims at column 7, line 4, claim 10 (line 4), delete "$R_c$,".

In the Claims at column 8, line 6, claim 19 (line 2), delete "$R_c^\sigma$" and insert -- $R_c^\sigma$ --.

In the Claims at column 8, line 9, claim 20 (line 2), delete "$R_c^\sigma$" and insert -- $R_c^\sigma$ --.

In the Claims at column 8, line 49, claim 23 (line 8), insert --,-- after the word value.

In the Claims at column 8, line 63, claim 24 (line 13), delete ":" after the word pressure.

Signed and Sealed this

Twenty-eighth Day of October, 1997

Attest:

BRUCE LEHMAN

*Attesting Officer*     *Commissioner of Patents and Trademarks*